(12) United States Patent
Sun et al.

(10) Patent No.: US 11,807,116 B2
(45) Date of Patent: Nov. 7, 2023

(54) CHARGING SYSTEM

(71) Applicant: Delta Electronics (Shanghai) Co., Ltd., Shanghai (CN)

(72) Inventors: Liping Sun, Shanghai (CN); Hongyang Wu, Shanghai (CN); Jianjun Ni, Shanghai (CN); Teng Liu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 355 days.

(21) Appl. No.: 17/325,213

(22) Filed: May 20, 2021

(65) Prior Publication Data

US 2021/0362611 A1 Nov. 25, 2021

(30) Foreign Application Priority Data

May 21, 2020 (CN) .......................... 202010436384.7

(51) Int. Cl.
*H02J 7/00* (2006.01)
*B60L 53/12* (2019.01)
*H02J 50/40* (2016.01)

(52) U.S. Cl.
CPC ............ *B60L 53/12* (2019.02); *H02J 50/402* (2020.01); *B60L 2210/30* (2013.01); *H02J 2310/48* (2020.01)

(58) Field of Classification Search
None
See application file for complete search history.

(56) References Cited

FOREIGN PATENT DOCUMENTS

| CN | 107124027 A | 9/2017 |
|----|-------------|--------|
| CN | 208299522 U | 12/2018 |

*Primary Examiner* — Arun C Williams
(74) *Attorney, Agent, or Firm* — CKC & Partners Co., LLC (57) ABSTRACT

A charging system includes a multi-pulse transformer, n AC-DC conversion units, n power supply terminals and a charging scheduling apparatus. A plurality of secondary windings of the multi-pulse transformer form n winding pairs. The n AC-DC conversion units are coupled to the n winding pairs in a one-to-one correspondence. The n power supply terminals are coupled to the n AC-DC conversion units in a one-to-one correspondence. The charging scheduling apparatus are configured to detect the number of charging devices and states of the power supply terminals, and determine M target winding pairs from the n winding pairs for supplying power to the charging devices. The M target winding pairs include a winding pair distributed close to a first end of the magnetic core and a winding pair distributed close to a second end of the magnetic core.

13 Claims, 8 Drawing Sheets

CHARGING SYSTEM

CROSS-REFERENCE TO RELATED APPLICATION

This application claims priority to Chinese Patent Application No. 202010436384.7, filed on May 21, 2020, which is hereby incorporated by reference in its entirety.

TECHNICAL FIELD

The present application relates to the field of power electronics technology and, in particular, to a charging system.

BACKGROUND

With the development of electric vehicles, it is necessary to establish a large number of charging stations for matching. Reducing charging loss is one of design goals of a charging system in charging stations. However, the leakage magnetic flux of windings of a transformer in the charging system will cause loss.

In the prior art, an influence of the leakage magnetic flux is reduced by modifying the structure of the transformer itself. However, changing the transformer structure is difficult and will increase complexity of the transformer structure. Further, and the change of the transformer structure may also bring about a change in characteristics of the transformer.

It should be noted that the information disclosed in the background above is only intended to enhance understanding of the background of the present application, and therefore may include information that does not constitute the prior art known to those of ordinary skill in the art.

SUMMARY

An embodiment of the present application provides a charging system, which reduces an electromagnetic loss of the multi-pulse transformer.

A first aspect of an embodiment of the present application provides a charging system, including: a multi-pulse transformer, n alternating current-direct current conversion units, n power supply terminals and a charging scheduling apparatus. The multi-pulse transformer includes a primary winding, a magnetic core and a plurality of secondary windings. The plurality of secondary windings form n winding pairs. The n alternating current-direct current conversion units are electrically connected to the n winding pairs in a one-to-one correspondence, and an input end of each alternating current-direct current conversion unit is electrically connected to a corresponding winding pair. The n power supply terminals are electrically connected to the n alternating current-direct current conversion units in a one-to-one correspondence, and each power supply terminal is electrically connected to an output end of a corresponding alternating current-direct current conversion unit. The charging scheduling apparatus is configured to detect the number M of charging devices and states of the power supply terminals, and determine M target winding pairs from the n winding pairs for supplying power to the charging devices. The M target winding pairs include a winding pair distributed close to a first end of the magnetic core and a winding pair distributed close to a second end of the magnetic core.

Optionally, the n winding pairs are sequentially distributed along a center line of the magnetic core; and the target winding pairs for supplying power to the charging devices at least includes the i-th winding pair and the n−i-th winding pair, 3=>i=>1 and n>3.

Optionally, the n winding pairs are sequentially distributed along the center line of the magnetic core. If it is determined that M is two, the charging scheduling apparatus is configured to determine two winding pairs sequentially distributed at both ends of the n winding pairs as the target winding pairs; and if it is determined that M is greater than two, the charging scheduling apparatus is configured to determine the two winding pairs sequentially distributed at both ends of the n winding pairs, and M−2 winding pairs distributed between the 2 winding pairs as the target winding pairs.

Optionally, the M−2 winding pairs distributed between the 2 winding pairs are evenly distributed.

Optionally, if it is determined that M is greater than or equal to n/2, the charging scheduling apparatus is configured to determine winding pairs distributed at an interval as n/2 target winding pairs for supplying power to n/2 charging devices; and the interval is one winding pair, and n is an even number.

A second aspect of an embodiment of the present application provides a charging system, including: a multi-pulse transformer, n power supply apparatuses and a charging scheduling apparatus. The multi-pulse transformer includes: a primary winding, a magnetic core and a plurality of secondary windings, and the plurality of secondary windings form 2n winding pairs. Each power supply apparatus electrically connected to two winding pairs, and includes a first alternating current-direct current conversion unit and a second alternating current-direct current conversion unit. An input end of the first alternating current-direct current conversion unit is electrically connected to one winding pair of the two winding pairs, an output end of the first alternating current-direct current conversion unit forms a first power supply terminal, and an input end of the second alternating current-direct current conversion unit is electrically connected to the other winding pair of the two winding pairs, an output end of the second alternating current-direct current conversion unit forms a second power supply terminal. The charging scheduling apparatus is configured to detect the number M of charging devices and state of power supply terminals, and determine target winding pairs from the 2n winding pairs for supplying power to the charging devices. The target winding pairs include a winding pair distributed close to a first end of the magnetic core and a winding pair distributed close to a second end of the magnetic core.

Optionally, the winding pair electrically connected to the first alternating current-direct current conversion unit includes a first winding and a second winding, the winding pair electrically connected to the second alternating current-direct current conversion unit includes a third winding and a fourth winding, and phases of output voltages of the first winding, the third winding, the second winding, and the fourth winding are sequentially shifted left or right by 15°.

Optionally, the 2n winding pairs are sequentially distributed along a center line of the magnetic core.

Optionally, if it is determined that M is three, the charging scheduling apparatus is configured to determine two winding pairs sequentially distributed at both ends of the 2n winding pairs, and one winding pair adjacent to one of the two winding pairs as the target winding pairs, and the adjacent winding pairs are electrically connected to the same power supply apparatus.

Optionally, if it is determined that M is greater than or equal to four, the charging scheduling apparatus is configured to determine two winding pairs distributed at the first end of the magnetic core and two winding pairs distributed at the second end of the magnetic core as four target winding pairs for supplying power to four charging devices; and the two winding pairs distributed on the first end of the magnetic core are electrically connected to one power supply apparatus, and the two winding pairs distributed on the second end of the magnetic core are electrically connected to another power supply apparatus.

Optionally, if it is determined that M is greater than four, the charging scheduling apparatus is configured to determine remaining M−4 target winding pairs from winding pairs between the two winding pairs distributed on the first end of the magnetic core and the two winding pairs distributed on the second end of the magnetic core.

Optionally, M is an even number, and the remaining M−4 target winding pairs are electrically connected to M/2−2 power supply apparatuses.

Optionally, the M−4 target winding pairs between the two winding pairs distributed at the first end of the magnetic core and the two windings distributed at the second end of the magnetic core are evenly distributed.

In the charging system provided by the present application, M target winding pairs include the winding pair distributed close to the first end of the magnetic core and the winding pair distributed close to the second end of the magnetic core, thereby achieving that a magnetic field range of the target windings on the magnetic core is close to a magnetic field range of the primary winding on the magnetic core, reducing the winding loss generated by the leakage magnetic flux of the primary winding, and reducing the eddy current loss in a surrounding metal generated by the leakage magnetic flux. As a result, the loss of the multi-pulse transformer is reduced.

It should be understood that the above general description and the following detailed description are only exemplary and explanatory, and do not limit the application.

DETAILED DESCRIPTION OF THE EMBODIMENTS

In order to make purposes, technical solutions and advantages of embodiments of the present application clearer, technical solutions in the embodiments of the present application will be clearly and comprehensively described in conjunction with the drawings in the embodiments of the present application. Obviously, the described embodiments are part of embodiments of the present application, rather than all of the embodiments. All other embodiments obtained by those skilled in the art based on the embodiments of the present application without creative effort are within the protection scope of the present application.

The terms "first", "second", "third", "fourth" and the like in the description, claims and the above drawings of the present application are used to distinguish similar objects rather than to describe a specific sequence or order. It should be understood that the data used in this way is interchangeable where appropriate, so that the embodiments of the present application described herein can be implemented, for example, in a sequence other than those sequences illustrated or described herein.

It should be understood that in various embodiments of the present application, big or small of the sequence number of each process does not mean the sequence of execution, and the sequence of execution of each process shall be determined by its function and internal logic, and shall not constitute any restriction on the implementation process of the embodiment of the present application.

It should be understood that in the present application, "comprise" and "have" and any variations of them are intended to cover a non-exclusive inclusion. For example, process, method, system, product, or device, which comprises a series of steps or units are not necessarily limited to those steps or units clearly listed, but may include other step or unit that is not clearly listed or inherent to such process, method, product or device.

It should be understood that in the present application, "a plurality of" means two or more.

It should be understood that, the term "connection" herein includes any means of direct and indirect electrical connections. Therefore, if the text describes that a first element is connected to a second element, it means that the first element can be electrically connected directly to the second element, or indirectly to the second element through other element or connection means.

It should be understood that in the present application, "B corresponding to A", "A corresponding to B", "A corresponds to B" or "B corresponds to A" represents that B is associated with A, and B can be determined according to A. Determining B according to A does not mean that B is determined only by A, and B can also be determined based on A and/or other information. A matching between A and B is that the similarity between A and B is greater than or equal to a preset threshold.

Depending on the context, "if" as used herein can be interpreted as "at the time of" or "when" or "in response to a determination" or "in response to a detection".

The technical solutions of the present application will be described in detail below with specific embodiments. The following specific embodiments can be combined with each other, and the same or similar concepts or processes may not be repeated in some embodiments.

In order to solve the technical problem of high transformer loss in the existing charging system, the present application provides a charging system that reduces the winding loss generated on the winding due to the leakage magnetic flux of the primary winding, and also reduces the eddy current loss in the surrounding metal due to the leakage magnetic flux, thereby reducing the loss of a multi-pulse transformer. Various optional structures of the charging system provided in the present application will be illustrated in conjunction with the drawings and specific embodiments.

Figure 1:
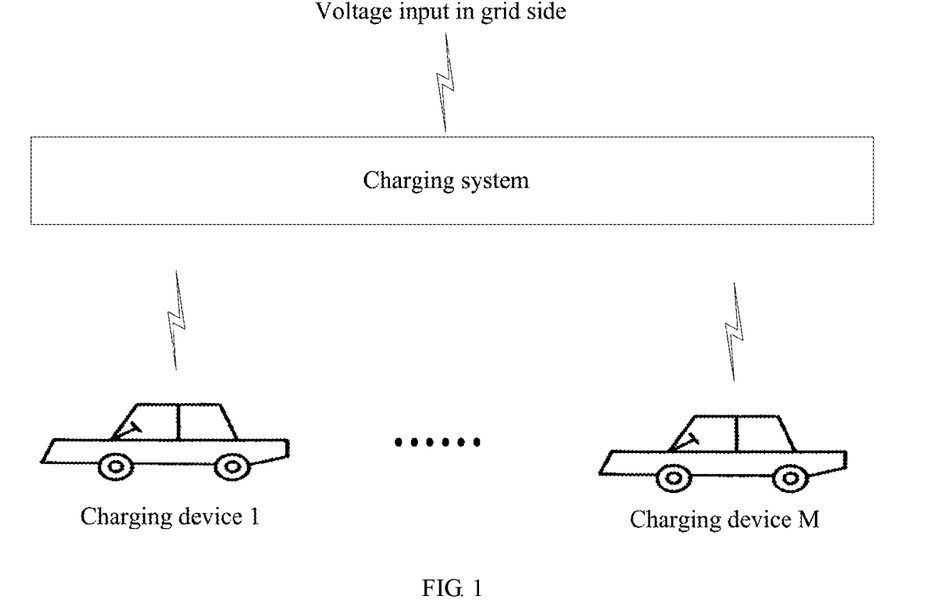
FIG. 1 is a schematic diagram of an application scenario of an embodiment of the present application.

Refer to FIG. 1, which is a schematic diagram of an application scenario of an embodiment of the present application. In the scenario shown in FIG. 1, a charging system is installed in a charging station, and a charging device may be an electric vehicle that needs to be charged. M electric vehicles are connected to the charging system of the charging station for charging. In the prior art, an electric vehicle is randomly connected to an idle power supply terminal, some of power supply terminals work, and the other power supply terminals are idle. In this case, a transformer in the charging system generates large leakage magnetic flux. And the large leakage magnetic flux generates large winding loss, and large eddy current loss on a metal shell where the transformer is installed. If the structure of the transformer itself is modified to reduce the influence of the leakage magnetic flux, the design difficulty and structural complexity of the transformer will be increased. Further, the change of the structure may also change properties of the transformer, and bring about insufficient reliability. In order to reduce the loss generated by the transformer when it is working under not full load, the charging system provided by the embodiment of the present application can be applied in the scenario shown in FIG. 1. The charging system provided by the present application can scheduling the distribution of secondary windings in a working state, thereby reducing the leakage magnetic flux and coupling between windings. As a result, the loss generated by the leakage magnetic flux can be reduced.

Figure 2:
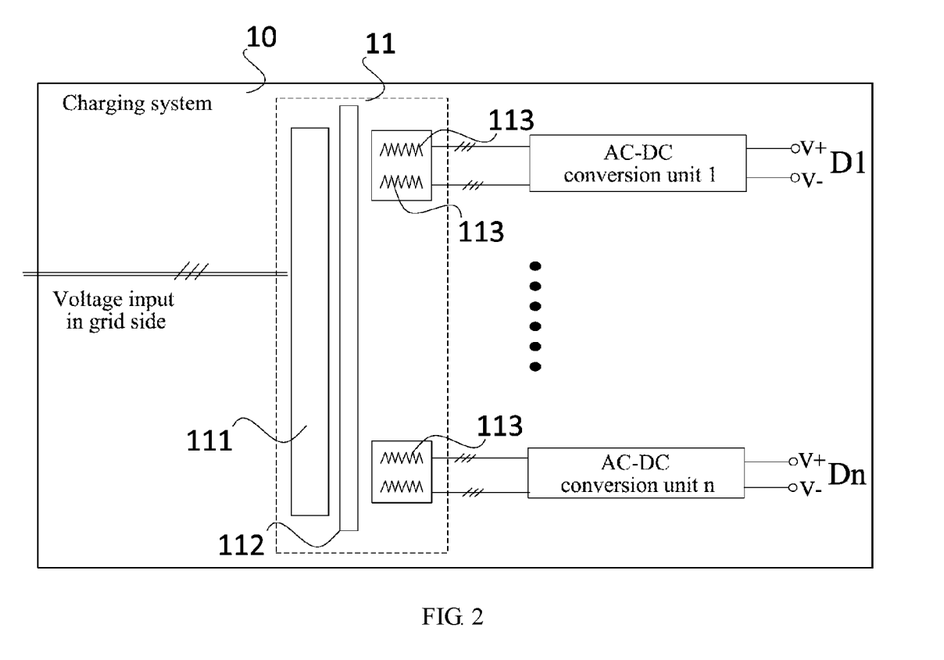
FIG. 2 is a schematic structural diagram of a charging system according to an embodiment of the present application.

Refer to FIG. 2, which is a schematic structural diagram of a charging system according to an embodiment of the present application. A charging system 10 shown in FIG. 2 includes: a multi-pulse transformer 11, AC-DC conversion units (1, . . . , n), power supply terminals (D1, . . . , Dn) and a charging scheduling apparatus (not shown in the figure).

The multi-pulse transformer 11 includes a primary winding 111, a magnetic core 112 and a plurality of secondary windings 113. The plurality of secondary windings 113 form n winding pairs. In the present embodiment, the number of the secondary windings 113 of the multi-pulse transformer 11 is even, and two secondary windings form one winding pair. The multi-pulse transformer 11 shown in FIG. 2 may be a 24-pulse transformer, a 36-pulse transformer, a 48-pulse transformer, a 64-pulse transformer or a 72-pulse transformer, and is not limited herein. Further, a phase shift angles between two secondary windings in each winding pair is 30°.

As shown in FIG. 2, the n AC-DC conversion units are electrically connected to the n winding pairs in a one-to-one correspondence, and an input end of each AC-DC conversion unit is electrically connected to a corresponding winding pair. The n power supply terminals (D1, . . . , Dn) are electrically connected to the n AC-DC conversion units in a one-to-one correspondence, and each power supply terminal is electrically connected to an output end of a corresponding AC-DC conversion unit. The power supply terminals may be power supply interfaces electrically connected to charging piles. In some embodiments, the power supply terminals may be fixed to and electrically connected to the charging piles in a one-to-one correspondence. The charging scheduling apparatus may realize distribution control of the power supply terminals in working state by scheduling the charging piles to which the charging device is connected. In other embodiments, the power supply terminals may be selectively electrically connected to the charging piles. The charging scheduling apparatus may realize distribution control of the power supply terminals in working state by selecting power supply terminals, and the power supply terminals selected are electrically connected to the charging piles with the charging device.

The charging scheduling apparatus in the present embodiment is configured to detect the number M of the charging devices and states of the power supply terminals, and determine M target winding pairs from the n winding pairs for supplying power to M charging devices. The M target winding pairs include at least one winding pair distributed close to a first end of the magnetic core and at least one winding pair distributed close to a second end of the magnetic core.

It should be understood that in the n winding pairs, the winding pairs electrically connected to the power supply terminals for charging the charging devices is the target winding pairs. In the case that the number M of the charging devices is less than the number n of the winding pairs, the power supply terminals corresponding to part of the secondary windings 113 connect no charging device and are in an idle state. The primary winding 111 corresponding to the secondary winding 113 in the idle state generates larger leakage magnetic flux. In order to reduce the loss generated by the leakage magnetic flux, the charging scheduling apparatus selects a plurality of winding pairs from n winding pairs according to the number M of the charging devices and the state of each power supply terminal and the plurality of winding pairs selected are used as the target winding pairs for supplying power to the charging devices. When the charging scheduling apparatus selects the target winding pairs, the winding pairs distributed close to the two ends of the magnetic core are all included in the target winding pairs, so that a distribution range of the target winding pairs are close to a distribution range of the primary winding 111, thereby further offsetting a magnetic field formed by the target winding pair in working state with a magnetic field formed by the primary winding, and reducing the loss of the multi-pulse transformer caused by the leakage magnetic flux and the influence of the leakage magnetic flux on the metal shell of the transformer.

A charging system provided by the present embodiment includes a multi-pulse transformer, AC-DC conversion units, power supply terminals and a charging scheduling apparatus. The multi-pulse transformer includes a primary winding, a magnetic core and a plurality of secondary windings. The plurality of secondary windings form n winding pairs. The n AC-DC conversion units are electrically connected to the n winding pairs in a one-to-one ratio, and an input end of each AC-DC conversion unit is electrically connected to a corresponding winding pair. The n power supply terminals are electrically connected to the n AC-DC conversion units in a one-to-one ratio, and each power supply terminal is electrically connected to an output end of a corresponding AC-DC conversion unit. The charging scheduling apparatus is configured to detect the number M of the charging devices and states of the power supply terminals, and determine M target winding pairs for supplying power to the charging devices in the n winding pairs. The M target winding pairs include at least one winding pair distributed close to the first end of the magnetic core and at least one winding pair distributed close to the second end of the magnetic core, so that a magnetic field range of the target windings on the magnetic core is close to a magnetic field range of the primary winding on the magnetic core. As a result, the winding loss generated by the leakage magnetic flux of the primary winding is reduced, and reducing an eddy current loss in a surrounding metal generated by the leakage magnetic flux is also reduced, thereby reducing the loss of a multi-pulse transformer.

Figure 3A:
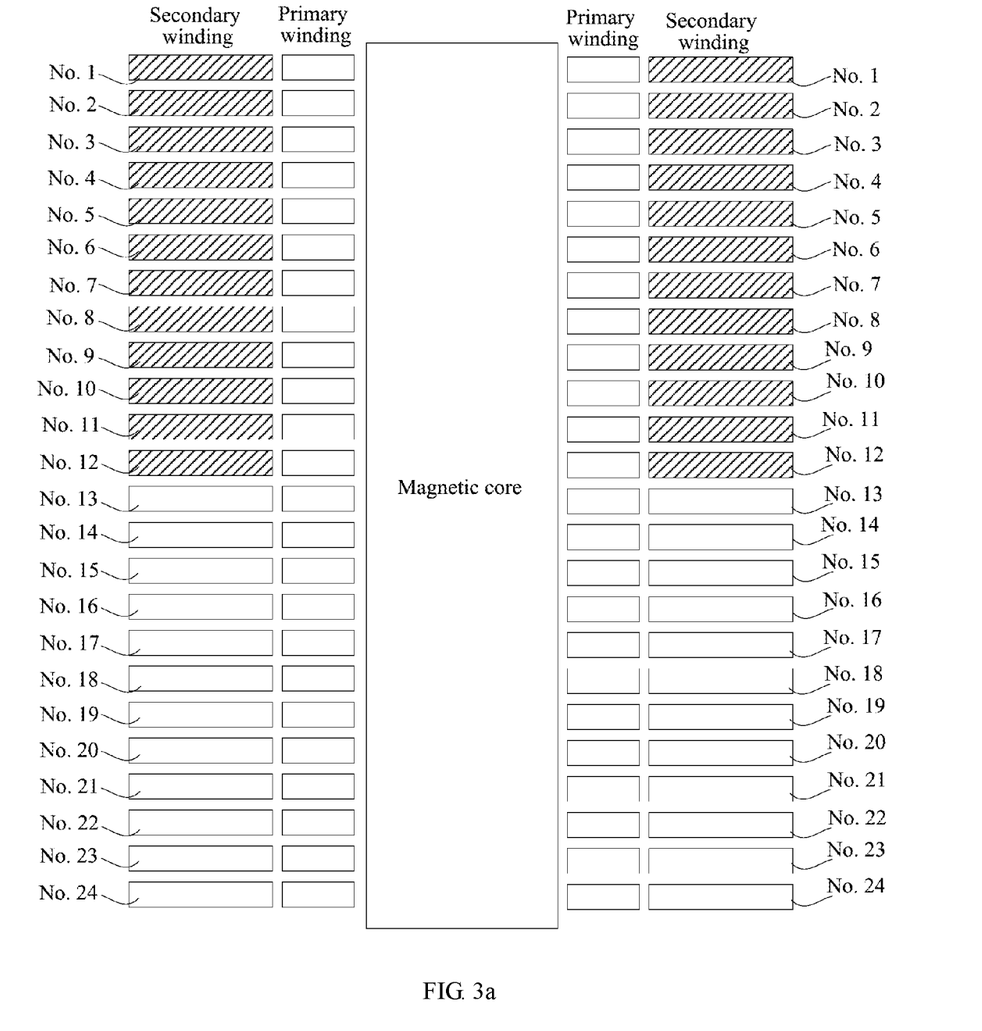
FIG. 3*a* is an existing distribution diagram of target winding pairs.

Refer to FIG. 3a, which is an existing distribution diagram of the target winding pairs. As shown in FIG. 3a, the primary winding and the secondary windings are wound concentrically on the magnetic core, and FIG. 3a is a schematic cross-sectional view. When electric vehicles are connected to the power supply terminals sequentially, the winding pairs are sequentially connected to the multi-pulse transformer, resulting in that the target winding pairs for charging the electric vehicles are concentrated on one end of the magnetic core, and idle winding pairs are concentrated on the other end of the magnetic core. The magnetic field of the secondary windings of the multi-pulse transformer shown in FIG. 3a is concentrated on the upper part of the magnetic core. It is assumed that there are twelve electric vehicles that need to be charged, and the number of the winding pairs is twenty-four. In the example shown in FIG. 3a, the twelve vehicles are connected to the twelve power supply terminals connected sequentially to the winding pairs from NO. 1 to NO. 12 (shown with oblique lines in FIG. 3a). Refer to Table 1, which shows two sets simulation data of loss in the present application. A set is the simulation data of FIG. 3a. In the set of the simulation data of FIG. 3a, if the influence of the leakage magnetic flux is not considered, a total loss on the primary side is 886 W, and a total loss on the secondary side is 996 W, so a total loss of the multi-pulse transformer is 1882 W. If the influence of the leakage magnetic flux is considered, the total loss on the primary side is 1054 W, and the total loss on the secondary side is 1310 W, so the total loss of the multi-pulse transformer is 2366.2 W. Furthermore, a single-side loss of the metal shell of the multi-pulse transformer is 646 W.

Figure 3B:
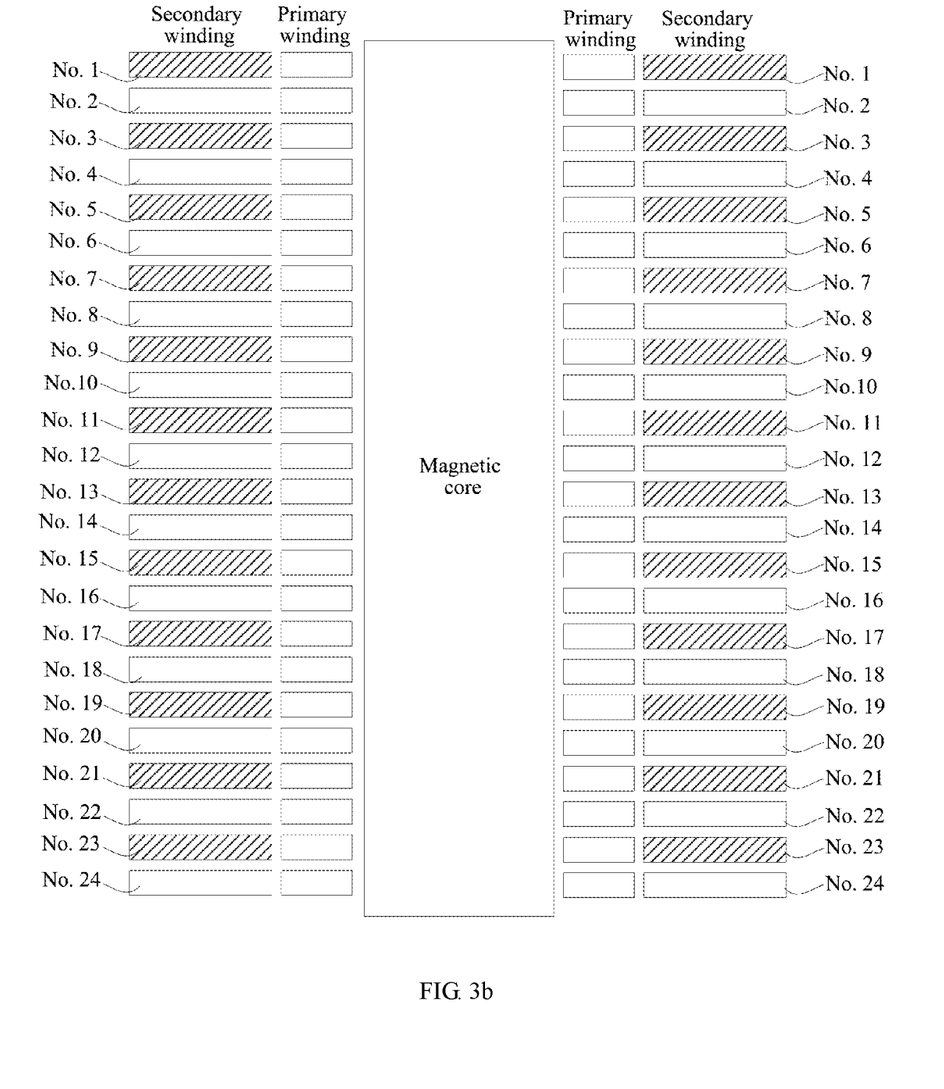
FIG. 3*b* is an distribution diagram of target winding pairs according to an embodiment of the present application.

Refer to FIG. 3b, which is a distribution diagram of the target winding pairs according to an embodiment of the present application. In an optional embodiment shown in FIG. 3b, the primary winding and the secondary windings are wound concentrically on the magnetic core, and FIG. 3b is a schematic cross-sectional view. When the electric vehicles are connected to the power supply terminals, the winding pairs formed by the secondary windings of the multi-pulse transformer are scheduled by the charging scheduling apparatus. The winding pairs close to the first end of the magnetic core and the winding pairs close to the second end of the magnetic core are used as the target winding pairs, and the winding pairs are evenly selected between the two ends and used as the target winding pairs. In the example shown in FIG. 3b, the target winding pairs are distributed in the winding pairs at intervals, and a projection of the distribution range of the target windings on the magnetic core is close to a projection of the distribution range of the primary windings on the magnetic core. The magnetic fields of the secondary windings of the multi-pulse transformer shown in FIG. 3b are evenly distributed over an entire range of the magnetic core. It is continued to assume that there are twelve electric vehicles that need to be charged, and the number of winding pairs is twenty-four. In the example shown in FIG. 3b, the twelve vehicles are connected to twelve power supply terminals connected dispersively to the winding pairs No. 1, No. 3, No. 5, No. 7, No. 9, No. 11, No. 13, No. 15, No. 17, No. 19, No. 21 and No. 23 (shown with oblique lines in FIG. 3b). Refer to Table 1, in the set of simulation datas of FIG. 3b, if the influence of the leakage magnetic flux is not considered, the total loss of the multi-pulse transformer is 1885 W. If the influence of the leakage magnetic flux is considered, the total loss of the multi-pulse transformer is 1925.7 W. Furthermore, the single-side loss of the metal shell of the multi-pulse transformer is 4 W.

Continuing to refer to Table 1, the target winding pair distribution shown in FIG. 3b is compared to the target winding pair distribution shown in FIG. 3a. In the case that the influence of the leakage magnetic flux is considered, the total loss of the transformer is reduced by 440.5 W, and the single-side loss of the metal shell is reduced by 642 W, achieving a good effect of reducing loss.

TABLE 1

| Target winding pair distribution | Total loss of the transformer without considering the leakage magnetic flux | Total loss of the transformer with considering the leakage magnetic flux | Single-side loss of the metal shell |
| --- | --- | --- | --- |
| Concentrated distribution at one end (FIG. 3a) | 1882 W | 2366.2 W | 646 W |
| Overall dispersed distribution (FIG. 3b) | 1885 W | 1925.7 W | 4 W |

As shown in FIG. 2, FIG. 3a and FIG. 3b, n winding pairs are sequentially distributed along the center line of the magnetic core. The winding pairs distributed close to both ends of the magnetic core, for example, may be one of the first i winding pairs from the beginning of a sequence order, and one of the last i winding pairs from the end of the sequence. A value of i can be any of 1 to 4.

In some embodiments, as the target winding pairs, the winding pair distributed close to the first end of the magnetic core may correspond to any one of three winding pairs in an positive order; and the winding pair distributed close to the second end of the magnetic core may also contain any one of three winding pairs in a reverse order.

In some embodiments, the charging scheduling apparatus is specifically configured to use the i-th winding pair and the n−i-th winding pair in a sequence as the target winding pairs for supplying power to the charging devices, 3=>i=>1, n>3. For example, if the winding pair No. 1 in FIG. 3b is used as one of the target winding pairs, the winding pair No. 23 is also used as one of the target winding pairs at the same time. For another example, if winding pair No. 2 in FIG. 3b is used as one of the target winding pairs, the winding pair No. 22 is also used as one of the target winding pairs at the same time. For yet another example, if the winding pair No. 3 in FIG. 3b is used as one of the target winding pairs, the winding pair No. 21 is also used as one of the target winding pairs at the same time. The i-th winding pair is distributed close to the first end of the magnetic core, and the n−i-th winding pair is distributed close to the second end of the magnetic core. However, the present application is not limited to this, for example, if the winding pair No. 1 in FIG. 3b is used as one of the target winding pairs, the winding pair No. 24 or No. 22 is also used as one of the target winding pairs. For another example, if the winding pair No.

2 in FIG. 3b is used as one of the target winding pairs, the winding pair No. 24 or No. 23 is also used as one of the target winding pairs at the same time. For yet another example, if the winding pair No. 3 in FIG. 3b is used as one of the target winding pairs, the winding pair No. 24 or No. 23 or No. 22 is also used as one of the target winding pairs at the same time. As long as the plurality of target winding pairs include the winding pairs distributed close to the first end and the second end, they should belong to the protection scope of the present application.

The n winding pairs are distributed in sequence along the center line of the magnetic core, and winding pairs at start and end positions are closer to both ends of the magnetic core.

If it is determined that M is two, the charging scheduling apparatus is specifically configured to determine two winding pairs sequentially distributed at both ends as the target winding pairs. For example, the winding pair No. 1 and the winding pair No. 24 in FIG. 3b are as the target winding pairs.

If it is determined that M is greater than two, the charging scheduling apparatus is specifically configured to determine the two winding pairs sequentially distributed at both ends, and M−2 winding pairs distributed between the 2 winding pairs as the target winding pairs.

When it is detected that only two charging devices need to be charged, the charging scheduling apparatus schedules the power supply terminals corresponding to the winding pairs across the two ends of the magnetic core to connect to the two charging devices for supplying power. For example, the first winding pair and the last winding pair in an order are used as the target winding pairs. When it is detected that more than two charging devices need to be charged, the charging scheduling device not only schedules the two power supply ends corresponding to the winding pairs across the two ends of the magnetic core to connect to the two charging devices for supplying power, but also selects and schedules the remaining M−2 winding pairs from the winding pairs distributed between the winding pairs across the two ends of the magnetic core, and schedules M−2 power supply ends corresponding to the M−2 winding pairs to connect to the charging devices for supplying power. Therefore, a distribution of the target winding pairs in working state on the center line of the magnetic core is at the two ends and between the two ends of the magnetic core. Regardless of the scheduling scheme when M is two, or the scheduling scheme when M is greater than two, the first winding pair in the order and the last winding pair in the order are used as the target winding pairs, and thus the distribution range of the target winding pairs along the magnetic core is from the first winding pair in the order to the last winding pair in the order. The distribution range of the target winding pairs along the magnetic core, the distribution range of the primary winding along the magnetic core, and the distribution range of the secondary winding pairs along the magnetic core are all consistent. The consistent distribution range makes the magnetic field of the primary winding and the magnetic field of the target winding cover each other, reducing the loss of the multi-pulse transformer, reducing the influence of the leakage magnetic flux, and reducing an additional loss of the metal shell of the transformer at the same time. It should be noted that the first winding pair in the order and the last winding pair in the order here are not strictly the first and last numbers, as long as they are close to the first end (or the front end) and the second end (or the last end), which meet the requirements.

In some embodiments, when M is greater than two, the M−2 target winding pairs distributed between the two winding pairs selected by the charging scheduling apparatus are evenly distributed winding pairs. The "evenly distributed" here can be understood as: between every two adjacent target winding pairs, the number of interval winding pairs is one, two or zero, which could minimize the leakage magnetic flux, so as to minimize the loss caused by the leakage magnetic flux.

In some embodiments, if it is determined that M is greater than or equal to n/2, the charging scheduling apparatus is further configured to determine the winding pairs distributed at an interval as the target winding pairs that supplies power to n/2 charging devices, and the interval is one winding pair. It can be understood that if the charging scheduling apparatus detects that the number M of the charging devices is greater than half of the number n of the power supply terminals, it cannot guarantee that the number of winding pairs between every two adjacent target winding pairs is exactly the same, so n/2 target winding pairs are first determined as being distributed at an interval of single winding pair, and then the remaining M-n/2 target winding pairs are selected in interval winding pairs. Optionally, the charging scheduling apparatus can select the remaining M-n/2 target winding pairs in the interval winding pairs in an evenly selected manner, for example, the remaining M-n/2 target winding pairs are evenly distributed in the interval winding pairs.

In practical applications, the number of the charging devices is not fixed, and with the continuous connection or disconnection of electric vehicles, the number M of the charging devices changes. The charging scheduling device schedules the target winding pairs and their corresponding power supply terminals according to currently detected M. For example, the charging scheduling apparatus is specifically used to obtain the number M of the charging devices according to the number of connected charging devices plus the number of charging devices to be connected, when it is determined to connect a new charging device. Of course, the number M of the charging devices may also only include the number of the charging devices that need to be connected, that is, the target winding pairs and the power supply terminals are scheduled for the devices to be charged, and the original charging devices no longer participate in the scheduling.

Figure 4:
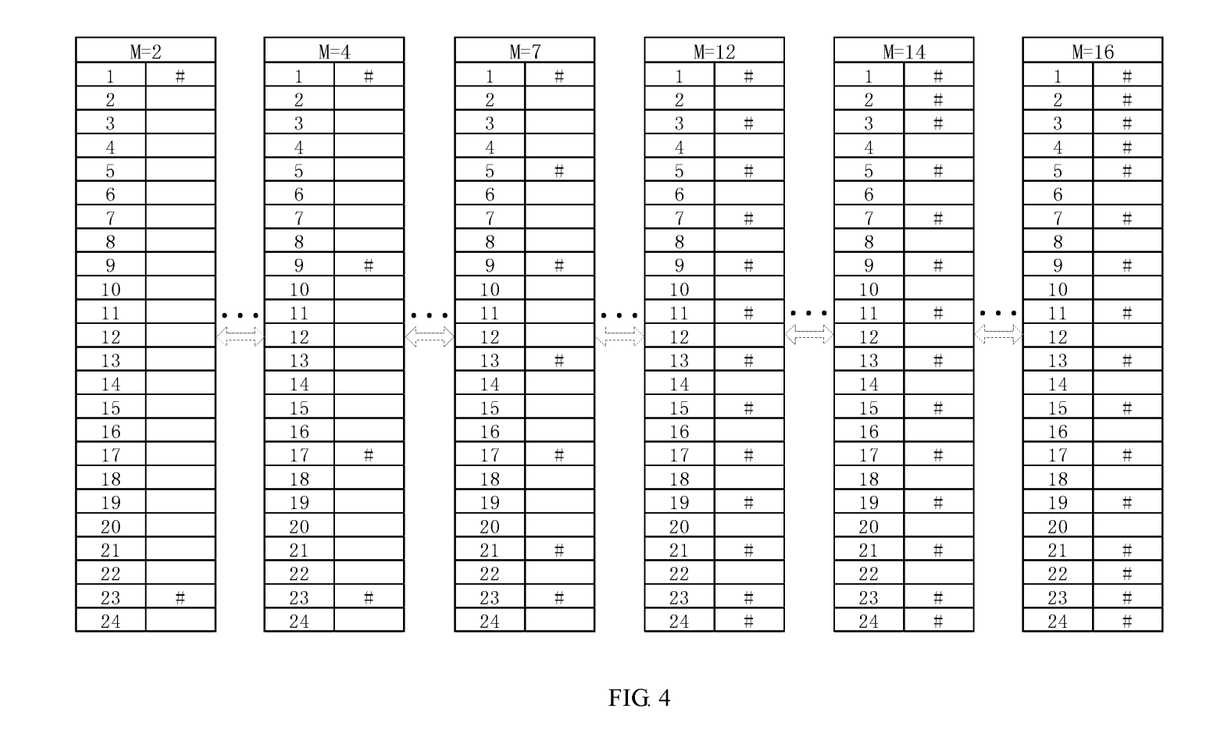
FIG. 4 is an scheduling example of target winding pairs according to an embodiment of the present application.

Refer to FIG. 4, which is a scheduling example of target winding pairs according to an embodiment of the present application. Taking FIG. 4 as an example, the symbol "#" represents a serial number of a winding pair selected as a target winding pair.

As shown in FIG. 4, when it is detected that the number M of the charging devices is two, the charging scheduling apparatus uses winding pairs No. 1 and No. 23 as the target winding pairs to charge the current two charging devices.

As shown in FIG. 4, when it is detected that the number M of the charging devices is four, the charging scheduling apparatus uses winding pairs No. 1, No. 9, No. 17 and No. 23 as the target winding pairs to charge the current four charging devices. In some embodiments, the number of charging devices is four, which is the original two charging devices plus two newly connected charging devices. In other embodiments, the number of charging devices is four, which corresponds to the 4 newly connected charging devices.

As shown in FIG. 4, when it is detected that the number M of the charging devices is seven, the charging scheduling apparatus uses the winding pairs No. 1, No. 5, No. 9, No. 13, No. 17, No. 21 and No. 23 as the target winding pairs to charge the current seven charging devices. In some embodiments, the number of charging device is seven, which is the original four charging devices plus three newly connected charging devices. In other embodiments, the number of charging devices is seven, which corresponds to the seven newly connected charging devices.

As shown in FIG. 4, when it is detected that the number M of the charging devices is twelve, the charging scheduling apparatus uses the winding pairs No. 1, No. 3, No. 5, No. 7, No. 9, No. 11, No. 13, No. 15, No. 17, No. 19, No. 21 and No. 23 as the target winding pairs to charge the current twelve charging devices. It can be seen that when M is n/2, the target winding pairs scheduled by the charging scheduling apparatus could realize strict even distribution, that is, the number of the winding pairs spaced between every two adjacent target winding pairs is the same. For example, the number of the winding pairs spaced between every two adjacent target winding pairs is one.

As shown in FIG. 4, when it is detected that the number M of the charging devices is fourteen, the charging scheduling apparatus uses winding pairs No. 1, No. 2, No. 3, No. 5, No. 7, No. 9, No. 11, No. 13, No. 15, No. 17, No. 19, No. 21, No. 23 and No. 24 as the target winding pairs to charge the current 14 charging devices. For example, winding pairs No. 1, No. 3, No. 5, No. 7, No. 9, No. 11, No. 13, No. 15, No. 17, No. 19, No. 21 and No. 23 are selected as the target winding pairs to charge the current 12 charging devices, and additionally winding pairs No. 2 and No. 24 are selected as target winding pairs to supply power to the remaining two newly connected charging devices. It can be seen that when M is greater than n/2, n/2 target winding pairs that are strictly evenly distributed can be determined first, and then the remaining M−n/2 target winding pairs can be selected symmetrically.

As shown in FIG. 4, when it is detected that the number M of the charging devices is sixteen, the charging scheduling apparatus uses winding pairs No. 1, No. 2, No. 3, No. 4, No. 5, No. 7, No. 9, No. 11, No. 13, No. 15, No. 17, No. 19, No. 21, No. 22, No. 23 and No. 24 as the target winding pairs to charge the current sixteen charging devices.

The embodiment shown in FIG. 4 is an optional implementation for the charging scheduling apparatus to evenly select winding pairs, but the application is not limited to this. For example, in the embodiment shown in FIG. 4, after winding pairs No. 1 and No. 23 (or No. 24) are determined as the target winding pairs, winding pairs can be randomly selected in sequence from winding pairs No. 2 to No. 22 winding pairs and used as the remaining target windings, which can reduce the loss of the multi-pulse transformer.

In the above embodiment, when the charging scheduling apparatus detects that a charging device has finished charging using a connected power supply terminal, it may also preferentially transfer the connected power supply terminal to a new device to be charged for charging, so as to maintain the original target winding pair distribution. A specific transfer method can be to schedule the new device to be charged for charging on a charging pile used by other charging devices which have finished charging, or to switch the connected power supply terminal to a charging pile where a new device to be charged is located by a switch. The specific transfer method is not limited here.

Figure 5:
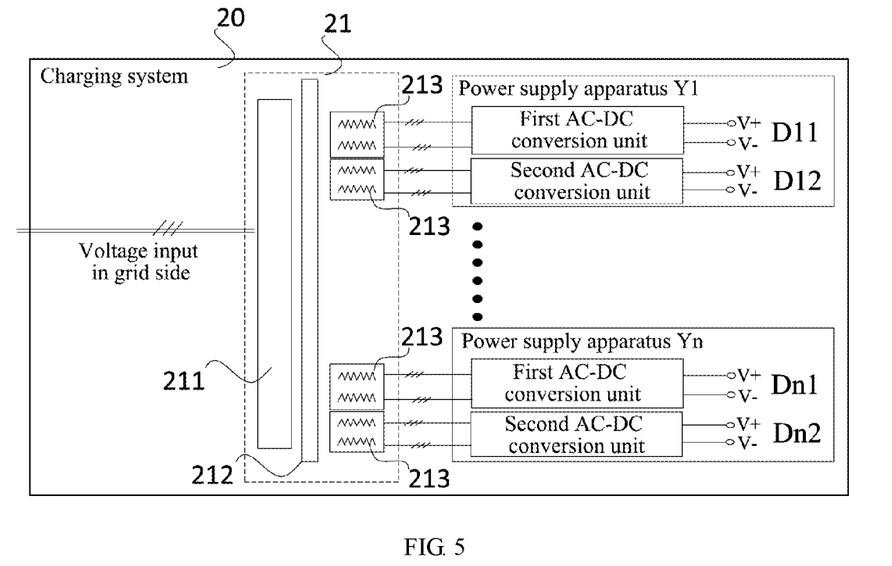
FIG. 5 is a schematic structural diagram of another charging system according to an embodiment of the present application.

The present application further provides another charging system. Refer to FIG. 5, which is a schematic structural diagram of another charging system according to an embodiment of the present application. The charging system 20 shown in FIG. 5 includes: a multi-pulse transformer 21, n power supply apparatuses (Y1, . . . , Yn) and a charging scheduling apparatus (not shown in the figure).

The multi-pulse transformer 21 includes a primary winding 211, a magnetic core 212 and a plurality of secondary windings 213. The plurality of secondary windings 213 form 2n winding pairs.

Each power supply apparatus (Y1, . . . , Yn) corresponds to 2 winding pairs. Referring to FIG. 5, each of the power supply apparatus (Y1, . . . , Yn) includes a first AC-DC conversion unit and a second AC-DC conversion unit. An input end of the first AC-DC conversion unit is electrically connected to one of the two winding pairs, and an output end of the first AC-DC conversion unit is a first power supply terminal (D11, . . . , Dn1). An input end of the second AC-DC conversion unit is electrically connected to the other of the two winding pairs, and an output end of the second AC-DC conversion unit is a second power supply terminal (D12, . . . , Dn2).

The charging scheduling apparatus is configured to detect the number M of the charging devices and the states of the power supply terminals, and determine a plurality of target winding pairs for supplying power to the charging devices among the 2n winding pairs. The plurality of target winding pairs include winding pairs distributed close to a first end of the magnetic core and winding pairs distributed close to a second end of the magnetic core.

The charging system 20 shown in FIG. 5 has a similar structure to the charging system 10 shown in FIG. 2, except that in the charging system 20 shown in FIG. 5, every two adjacent AC-DC conversion units form a power supply apparatus.

The charging system provided by the present embodiment includes a multi-pulse transformer, n power supply apparatuses and a charging scheduling apparatus. The multi-pulse transformer includes a primary winding, a magnetic core and a plurality of secondary windings. The plurality of secondary windings form 2n winding pairs. Each power supply apparatus is electrically connected to two winding pairs. The power supply apparatus includes a first alternating current-direct current conversion unit and a second alternating current-direct current conversion unit. The input end of the first alternating current-direct current conversion unit is electrically connected to one of the two winding pairs, the output end of the first alternating current-direct current conversion unit forms the first power supply terminal. The input end of the second alternating current-direct current conversion unit is electrically connected to the other of the two winding pairs, the output end of the second alternating current-direct current conversion unit forms the second power supply terminal. The charging scheduling apparatus is configured to detect the number M of the charging devices and the states of the power supply terminals, and determine target winding pairs for supplying power to the charging devices among the 2n winding pairs. The plurality of target winding pairs include the winding pairs distributed close to the first end of the magnetic core and the winding pairs distributed close to the second end of the magnetic core, thereby achieving that a magnetic field range of the target winding on the magnetic core is close to the magnetic field range of the primary winding on the magnetic core. As a result, the winding loss generated due to the leakage magnetic flux and the eddy current loss generated in the surrounding metal due to the leakage magnetic flux are reduced, thereby reducing the loss of the multi-pulse transformer.

In some embodiments, when two power supply terminals of a single power supply apparatus are connected to two charging devices for charging, a 24-pulse rectification charging system is formed current ripple and harmonic waves in the system are reduced. So the charging system of FIG. 5 can reduce transformer loss while reduce system harmonics. In each power supply apparatus shown in FIG. 5, a winding pair that connects to the first AC-DC conversion unit includes a first winding and a second winding, a winding pair that connects to the second AC-DC conversion unit includes a third winding and a fourth winding. And phases of the output voltages of the first winding, the third winding, the second winding, and the fourth winding are sequentially shifted left or right by 15°. When the first power supply terminal and the second power supply terminal of the same power supply apparatus are connected to the charging devices for charging at the same time, the 24-pulse rectification charging system is formed.

In the embodiment shown in FIG. 5, the 2n winding pairs are sequentially distributed along a center line of the magnetic core.

In some embodiments, if it is determined that M is two, the charging scheduling apparatus determines two winding pairs sequentially distributed at both ends in the 2n winding pairs as the target winding pairs. For example, the uppermost winding pair 213 and the lowermost winding pair 213 in FIG. 5 are determined as the target winding pairs, and in this case, power supply apparatus Y1 and power supply apparatus Yn respectively form 12-pulse rectification charging apparatuses, and cannot form the 24-pulse rectification charging apparatus.

If it is determined that M is three, the two winding pairs sequentially distributed at both ends in the 2n winding pairs, and one winding pair adjacent to one of the two winding pairs are determined as the target winding pairs. In this case, the adjacent winding pairs are electrically connected to the same power supply apparatus, and the power supply apparatus form the 24-pulse rectification charging.

Figure 6:
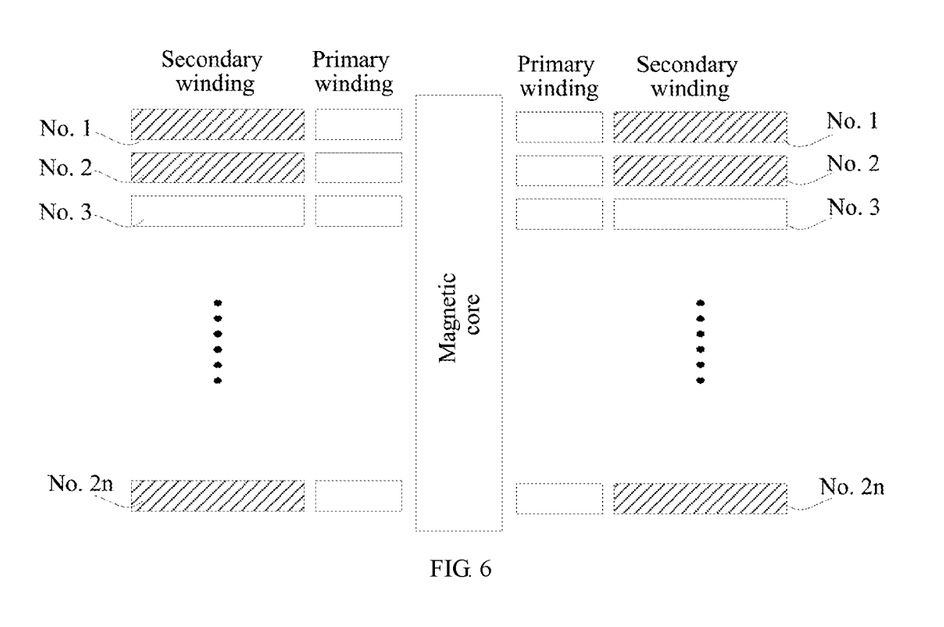
FIG. 6 is a target winding pair distribution of a structure shown in FIG. 5 according to an embodiment of the present application.

Refer to FIG. 6, which is a target winding pair distribution of the structure shown in FIG. 5 according to an embodiment of the present application. As shown in FIG. 6, the number M of the charging devices is equal to three, and the charging scheduling apparatus needs to determine three target winding pairs in the 2n winding pairs. The charging scheduling apparatus in FIG. 6 takes the first winding pair (No. 1) and the last winding pair (No. 2n) in an order as target winding pairs, and also takes the second winding pair (No. 2) in the order as a target winding pair. The first winding pair (No. 1) and the second winding pair (No. 2) in the order correspond to the same power supply apparatus Y1. The present embodiment is not limited to this, and in another implementation, the charging scheduling apparatus could take the first winding pair (No. 1) and the last winding pair (No. 2n) in the order as the target winding pairs, and at the same time, take a second winding pair (No. 2n–1) in a reverse order as the target winding pair. The last winding pair (No. 2n) in the order and the second winding pair (No. 2n–1) in the reverse order correspond to the same power supply apparatus Yn. Thus, while the influence of the leakage magnetic flux are reduced and the loss of the multi-pulse transformer is reduced, the power supply apparatus Yn can realize 24-pulse charging, reduce harmonic pollution and improve the quality of power supply.

For the implementation of determining that M is two in the present embodiment, it can refer to the embodiment where it is detected that M is equal to two among the various embodiments shown in FIG. 2, so similar principle and technical effect will not be repeated here.

In some embodiments, if it is determined that M is greater than or equal to four, the charging scheduling apparatus determines that two winding pairs distributed at the first end of the magnetic core and two winding pairs distributed at the second end of the magnetic core are used as two target winding pairs for supplying power to four charging devices. The two winding pairs distributed on the first end of the magnetic core are electrically connected to one power supply apparatus, and the two winding pairs distributed on the second end of the magnetic core are electrically connected to another power supply apparatus. It should be understood that when the number of the charging devices is four or greater than four, at least four target winding pairs can form two 24-pulse charging power supplies. For example, the first power supply apparatus in the order is used as one 24-pulse charging power supply, and the last power supply apparatus in the order is used as the other 24-pulse charging power supply. Therefore, while reducing the loss of the multi-pulse transformer, the power supply apparatus can be maximized to form the 24-pulse charging power supplies, thereby reducing the harmonics generated by the charging system.

In some embodiments, when M is greater than four, four target windings corresponding to two power supply apparatuses are firstly determined, and then remaining M–4 target winding pairs are determined in winding pairs between the two winding pairs distributed on the first end of the magnetic core and the two winding pairs distributed on the second end of the magnetic core. If M is an even number, the remaining M–4 target winding pairs determined by the charge scheduling apparatus are electrically connected to M/2–2 power supply apparatuses. It should be understood that if M is an even number, then M–4 is also an even number, so at least one power supply apparatus (that is, M/2–2) can be used to charge the remaining M–4 charging devices. For example, the number M of the charging devices is twelve, and the number 2n of the winding pairs is twenty-four. After the four target winding pairs located at both ends of the magnetic core are determined, eight target winding pairs additionally need to be determined. The eight target winding pairs can be four power supply apparatuses selected from ten power supply apparatuses located between the first power supply apparatus and the last power supply apparatus in the order. And eight winding pairs corresponding to the four power supply apparatuses selected are used as the remaining eight target winding pairs.

The M–4 target winding pairs between the two winding pairs distributed at the first end of the magnetic core and the two winding pairs distributed at the second end of the magnetic core, can be evenly distributed. The "evenly distributed" here can be understood as, between every two adjacent target winding pairs, the number of interval winding pairs is one, two or zero.

In some embodiments, the target winding pair distributed close to the first end of the magnetic core may correspond to any one of three winding pairs in a positive order; and the target winding pair distributed close to the second end of the magnetic core may also correspond to any one of the three winding pairs in a reverse order.

Figure 7:
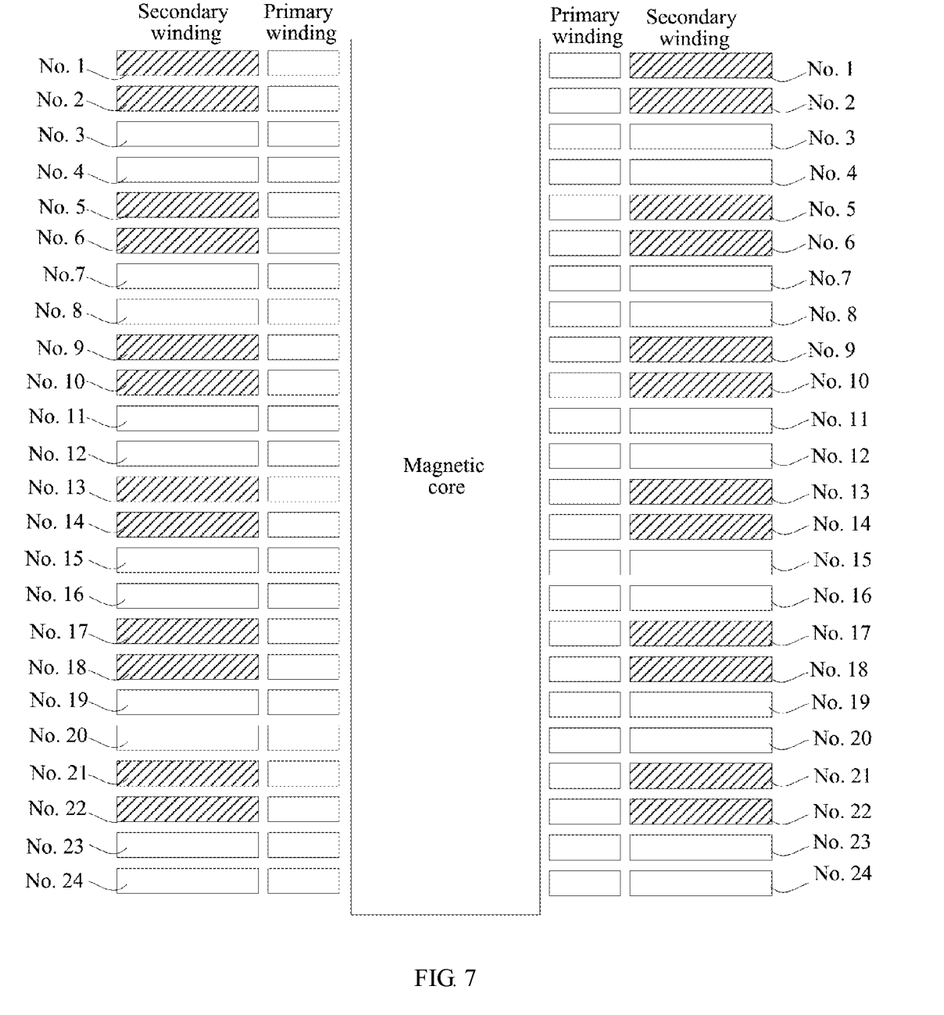
FIG. 7 is a target winding pair distribution of the structure shown in FIG. 5 according to another embodiment of the present application.

Refer to FIG. 7, which is another example of target winding pair distribution of a structure shown in FIG. 5. As shown in FIG. 7, the number M of the charging devices is twelve, and the number 2n of the winding pairs is twenty-four. The twenty-four winding pairs correspond to twelve power supply apparatuses sequentially (not shown in the figure). The twelve target winding pairs in FIG. 7 are winding pairs No. 1, No. 2, No. 5, No. 6, No. 9, No. 10, No. 13, No. 14, No. 17, No. 18, No. 21 and No. 22 sequentially (shown with oblique lines in FIG. 7). The winding pairs No.

1 and No. 2 correspond to the same power supply apparatus; the winding pairs No. 5 and No. 6 correspond to the same power supply apparatus; the winding pairs No. 9 and No. 10 correspond to the same power supply apparatus; the winding pairs No. 13 and No. 14 correspond to the same power supply apparatus; the winding pairs No. 17 and No. 18 correspond to the same power supply apparatus; the winding pairs No. 21 and No. 22 correspond to the same power supply apparatus. Therefore, six power supply apparatuses are used to charge the charging devices and perform the 24-pulse rectification charging, which reduces the system harmonics while reducing the loss of the transformer.

As shown in FIG. 5, the winding pair connected to the first AC-DC conversion unit includes the first winding and the second winding, and the winding pair connected to the second AC-DC conversion unit includes the third winding and the fourth winding. The first winding and the second winding obtain electrical energy from a primary side of the multi-pulse transformer which is coupled with a power grid. The first AC-DC conversion unit receives the electrical energy from the first winding and the second winding and converts the AC electrical energy into DC electrical energy. The DC electrical energy can be used to charge an equipment to be charged via the first power supply terminal. The equipment to be charged may be an electric automobile. The third winding and the fourth winding obtain electrical energy from the primary side of the multi-pulse transformer which is coupled with the power grid. The second AC-DC conversion unit receives the electrical energy from the third winding and the fourth winding and converts the AC electrical energy into DC electrical energy. The DC electrical energy can be used to charge an equipment to be charged via the second power supply terminal. The equipment to be charged may be an electric automobile.

The phases of the output voltages of the first winding, the third winding, the second winding, and the fourth winding are sequentially shifted left or sequentially shifted right by 15°. For example, the phase of the output voltage of the third winding 21 is shifted left for 15° relative to the phase of the output voltage of the first winding 11, the phase of the output voltage of the second winding 12 is shifted left for 150 relative to the phase of the output voltage of the third winding 21, and the phase of the output voltage of the fourth winding 22 is shifted left for 15° relative to the phase of the output voltage of the second winding 12. In the present embodiment, each power supply apparatus realizes dual output power supply, and meanwhile suppresses the grid-side harmonics, and reduces the circuit cost.

For example, when a charging device is connected to the first power supply terminal, the current flowing into the grid substantially contains a fundamental wave and 12k±1-th harmonic waves, k=1, 2, 3 . . . , And 6k±1-th harmonic waves are offset with each other, and k is an odd number. Thereby, harmonic waves into the grid decrease. When two charging devices are respectively connected to the first power supply terminal and the second power supply terminal for charging, the current flowing into the grid contains the fundamental wave and 24k±1-th harmonic waves, k=1, 2, 3 . . . . The 12k±1-th harmonic waves can be completely offset, thereby achieving a better power factor, k is an odd number. The power supply apparatus of the present embodiment is compatible, and can flexibly configure the power supply mode according to actual needs.

The first winding 11, the second winding 12, the third winding 21 and the fourth winding 22 have many kinds of structures. In some embodiments, the first winding may be a star winding; the second winding may be a delta winding; the third winding may be an epitaxy delta winding; and the fourth winding may be an epitaxy delta winding. However, the specific structures of the first winding, the second winding, the third winding, and the fourth winding in the present application are not limited, as long as their phases of the output voltages are sequentially shifted left or sequentially shifted right by 15°.

In the above embodiment, the first AC-DC conversion unit can have many implementations, and two kinds of alternative circuit structures of the first AC-DC conversion unit will be illustrated in conjunction with accompanying drawings.

Figure 8:
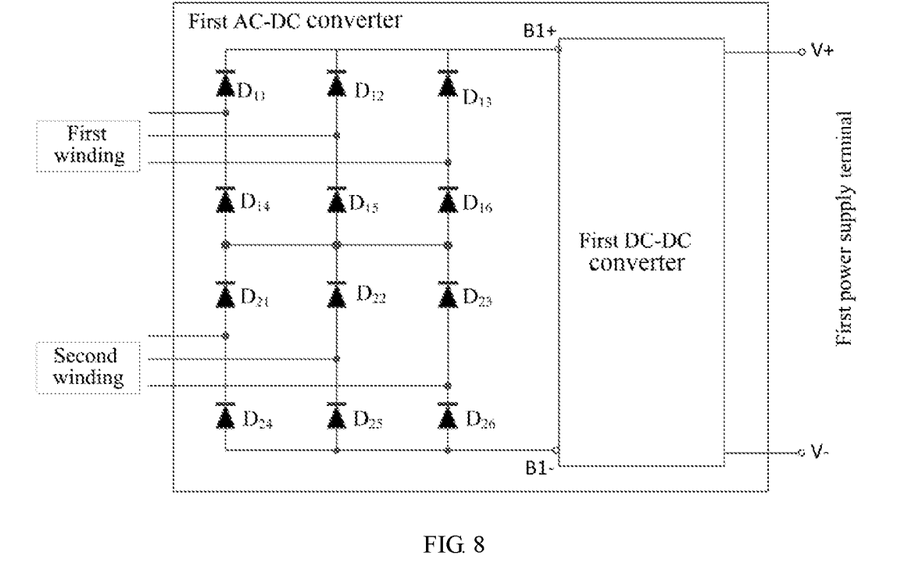
FIG. 8 is a schematic structural diagram of a first AC-DC conversion unit according to an embodiment of the present application.
Figure 9:
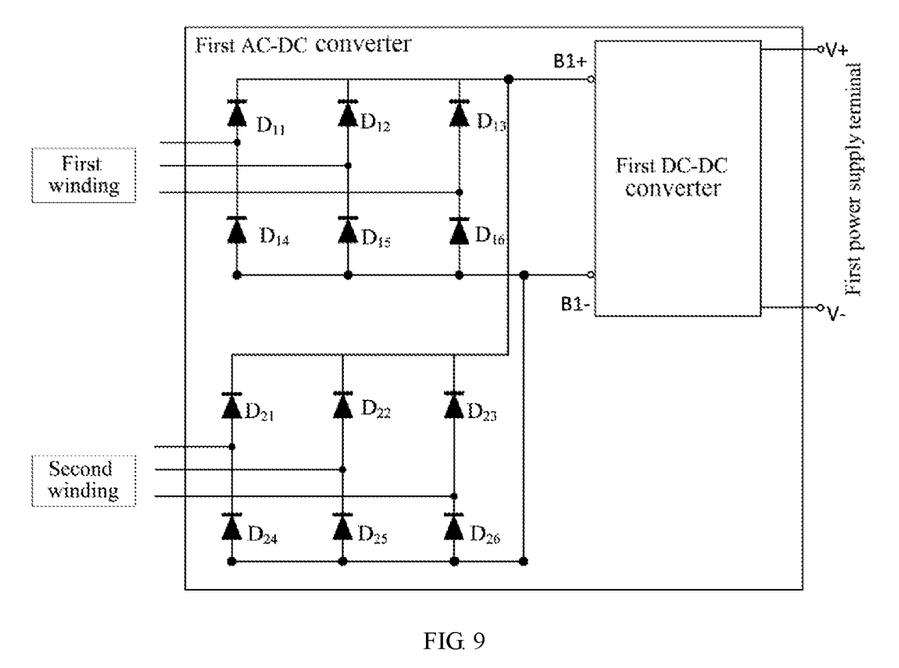
FIG. 9 is a schematic structural diagram of a first AC-DC conversion unit according to another embodiment of the present application.

Refer to FIG. 8, which is a schematic structural diagram of the first AC-DC conversion unit according to an embodiment of the present application. Refer to FIG. 9, which is a schematic structural diagram of the first AC-DC conversion unit according to another embodiment of the present application. Referring to FIG. 8 and FIG. 9, the first AC-DC conversion unit includes a first rectifier and a second rectifier. The first rectifier is composed of six diodes of D11, D12, D13, D14, D15 and D16, and the second rectifier is composed of six diodes of D21, D22, D23, D24, D25 and D26. The first AC-DC conversion unit may also include more rectifiers. The structures shown in FIGS. 8 and 9 which include the first rectifier and the second rectifier will be taken as examples in the following, and the present application is not limited to this.

As shown in FIGS. 8 and 9, the first rectifier is electrically connected to the first winding. Specifically, the input end of the first rectifier is electrically connected to the output end of the first winding. The three-phase alternating current of the first winding is input into the first rectifier which performs a conversion from alternating current to direct current. The second rectifier is electrically connected to the second winding. Specifically, the input end of the second rectifier is electrically connected to the output end of the second winding. The three-phase alternating current of the second winding is input into the second rectifier which performs a conversion from alternating current to direct current. In some embodiments, the outputs of the first rectifier and the second rectifier are connected in series. In other embodiments, the outputs of the first rectifier and the second rectifier are connected in parallel.

Referring to FIG. 8, the output ends of the first rectifier and the second rectifier are connected in series to form the first port (B1+, B1). The first AC-DC conversion unit further includes a first DC-DC converter. As shown in FIG. 8, the first DC-DC converter is connected between the first port and the first power supply terminal.

Referring to FIG. 9, the output ends of the first rectifier and the second rectifier are connected in parallel to form the first port (B1+, B1−). Similarly, the first AC-DC conversion unit further includes the first DC-DC converter. The first DC-DC converter is connected between the first port and the first power supply terminal.

Similarly, the second AC-DC conversion unit includes a third rectifier and a fourth rectifier. The third rectifier is electrically connected to the third winding. The second AC-DC conversion unit may also include more rectifiers, but a structure which includes a third rectifier and a fourth rectifier will be taken as an example in the following, and the present application is not limited to this.

The input end of the third rectifier is electrically connected to the output end of the third winding. The three-phase alternating current of the third winding is input into the third rectifier which performs a conversion from alternating current to direct current. The input end of the fourth rectifier is electrically connected to the output end of the fourth winding. The three-phase alternating current of the fourth winding is input into the fourth rectifier which performs a conversion from alternating current to direct current.

In some embodiments, the output ends of the third rectifier and the fourth rectifier are connected in series to form a second port. The second AC-DC conversion unit further includes a second DC-DC converter which is connected between the second port and the second power supply terminal (V2+, V2−). The structure of the second AC-DC conversion unit is similar to the first AC-DC conversion unit in FIG. 8, and the schematic diagram of FIG. 8 can be referred.

In other embodiments, the output ends of the third rectifier and the fourth rectifier are connected in parallel to form the second port. The second AC-DC conversion unit further includes the second DC-DC converter which is connected between the second port and the second power supply terminal (V2+, V2−). The structure of the second AC-DC conversion unit is similar to the first AC-DC conversion unit in FIG. 9, and the schematic diagram of FIG. 9 can be referred.

In the above embodiments, the structures of the first DC-DC conversion unit and the second DC-DC conversion unit may be the same or different, and the specific structures thereof are not limited herein.

Figure 10:
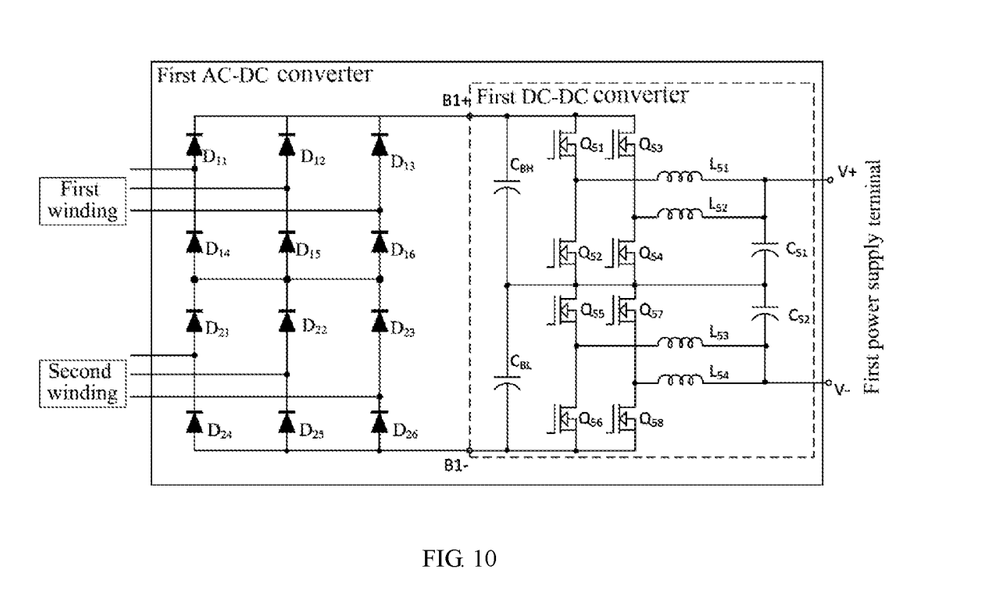
FIG. 10 is a schematic structural diagram of a first AC-DC conversion unit according to yet another embodiment of the present application.

Refer to FIG. 10, which is a schematic structural diagram of the first AC-DC conversion unit according to yet another embodiment of the present application. The first DC-DC converter mainly includes bus capacitors CBH, CBL, power tubes Q51, Q52, Q53, Q54, Q55, Q56, Q57, Q58, output inductors L51, L52, L53, L54, and output capacitors C51, C52. The power tubes Q51, Q52, Q53, and Q54 constitute a first direct current conversion circuit, and the power tubes Q55, Q56, Q57, and Q58 constitute a second direct current conversion circuit, but the present application is not limited to this. The currents obtained from the first ports B1+ and B1− are converted by the first DC-DC converter to output direct current to the first power supply terminal (V+, V−).

In some embodiments, such as the embodiment shown in FIGS. 8 and 9, both the first rectifier and the second rectifier are uncontrollable rectifiers. The uncontrollable rectifier has a simple circuit structure and low cost. However, the first rectifier and the second rectifier may also be active rectifiers. There is no limit on them herein.

In some embodiments, both the third rectifier and the fourth rectifier are uncontrollable rectifier. The uncontrollable rectifier has a simple circuit structure and low cost. However, the third rectifier and the fourth rectifier may also be active rectifiers. There is no limit on them herein.

In the above embodiments, preferably, the first rectifier, the second rectifier, the third rectifier, and the fourth rectifier have the same structure. When the first power supply terminal (V1+, V1−) and the second power supply terminal (V2+, V2−) simultaneously works, the 12k±1-th harmonic waves can be completely offset, thereby achieving a better power factor, k is an odd integer.

In some embodiments, the primary winding of the multi-pulse transformer may be a star winding or a delta winding.

In some embodiments, the number of the power supply apparatus is greater than or equal to two. If the number of the power supply apparatus is Z, then the charging system can provide 2Z power supply terminals to meet charging requirements of 2Z charging devices. Compared with a charging system composed of Z power supply apparatus with singular power supply terminal, the charging system of the application can configure power supply terminals more flexibly, obtain double number of power supply terminals, and improve the resource utilization rate.

Finally, it should be noted that the above embodiments are only used to illustrate the technical solutions of the present application, but not limit them; although the present application has been illustrated in detail with reference to the foregoing embodiments, those skilled in the art should understand that: the technical solutions described in the foregoing embodiments may still be modified, or some or all of the technical features therein can be equivalently replaced; and these modifications or replacements do not deviate the essence of the corresponding technical solutions from the scope of the technical solutions of the embodiments of the present application.

What is claimed is:

1. A charging system, comprising:
   a multi-pulse transformer, comprising a primary winding, a magnetic core and a plurality of secondary windings, wherein the plurality of secondary windings form n winding pairs;
   n alternating current-direct current conversion units are electrically connected to the n winding pairs in a one-to-one correspondence, wherein an input end of each alternating current-direct current conversion unit is electrically connected to a corresponding winding pair;
   n power supply terminals are electrically connected to the n alternating current-direct current conversion units in a one-to-one correspondence, wherein each power supply terminal is electrically connected to an output end of a corresponding alternating current-direct current conversion unit; and
   a charging scheduling apparatus, configured to detect the number M of charging devices and states of the power supply terminals, and determine M target winding pairs from the n winding pairs for supplying power to the charging devices;
   wherein the M target winding pairs comprise a winding pair distributed close to a first end of the magnetic core and a winding pair distributed close to a second end of the magnetic core; wherein n is a positive integer greater than or equal to 3, and M is a positive integer greater than or equal 2.

2. The system according to claim 1, wherein the n winding pairs are sequentially distributed along a center line of the magnetic core; and
   the target winding pairs for supplying power to the charging devices at least comprises the i-th winding pair and the n−i-th winding pair, wherein 3=>i=>1 and n>3.

3. The system according to claim 1, wherein the n winding pairs are sequentially distributed along a center line of the magnetic core; and
   if it is determined that M is two, the charging scheduling apparatus is configured to determine two winding pairs sequentially distributed at both ends of the n winding pairs as the target winding pairs;
   if it is determined that M is greater than two, the charging scheduling apparatus is configured to determine the two winding pairs sequentially distributed at both ends of the n winding pairs, and M−2 winding pairs distributed between the two winding pairs as the target winding pairs.

4. The system according to claim 3, wherein the M−2 target winding pairs distributed between the two winding pairs are evenly distributed.

5. The system according to claim 2, wherein if it is determined that M is greater than or equal to n/2, the charging scheduling apparatus is configured to determine winding pairs distributed at an interval as n/2 target winding pairs for supplying power to n/2 charging devices; and the interval is one winding pair, and n is an even number.

6. A charging system, comprising:
- a multi-pulse transformer, comprising a primary winding, a magnetic core and a plurality of secondary windings, wherein the plurality of secondary windings form 2n winding pairs;
- n power supply apparatus, each power supply apparatus is electrically connected to two winding pairs, and comprising a first alternating current-direct current conversion unit and a second alternating current-direct current conversion unit; wherein an input end of the first alternating current-direct current conversion unit is electrically connected to one winding pair of the two winding pairs, an output end of the first alternating current-direct current conversion unit forms a first power supply terminal, an input end of the second alternating current-direct current conversion unit is electrically connected to the other winding pair of the two winding pairs, and an output end of the second alternating current-direct current conversion unit forms a second power supply terminal; and
- a charging scheduling apparatus configured to detect the number M of charging devices and states of power supply terminals, and determine target winding pairs from the 2n winding pairs for supplying power to the charging devices;
- wherein the target winding pairs comprise a winding pair distributed close to a first end of the magnetic core and a winding pair distributed close to a second end of the magnetic core; wherein n is a positive integer greater than or equal to 3, and M is a positive integer than or equal to 2.

7. The system according to claim 6, wherein the winding pair electrically connected to the first alternating current-direct current conversion unit comprises a first winding and a second winding, the winding pair electrically connected to the second alternating current-direct current conversion unit comprises a third winding and a fourth winding, and phases of output voltages of the first winding, the third winding, the second winding, and the fourth winding are sequentially shifted left or right by 15°.

8. The system according to claim 7, wherein the 2n winding pairs are sequentially distributed along a center line of the magnetic core.

9. The system according to claim 8, wherein if it is determined that M is three, the charging scheduling apparatus is configured to determine two winding pairs sequentially distributed at both ends of the 2n winding pairs, and one winding pair adjacent to one of the two winding pairs as the target winding pairs, wherein the adjacent winding pairs are electrically connected to the same power supply apparatus.

10. The system according to claim 8, wherein if it is determined that M is greater than or equal to four, the charging scheduling apparatus is configured to determine two winding pairs distributed at the first end of the magnetic core and two winding pairs distributed at the second end of the magnetic core as four target winding pairs for supplying power to four charging devices; and wherein the two winding pairs distributed on the first end of the magnetic core are electrically connected to one power supply apparatus, and the two winding pairs distributed on the second end of the magnetic core are electrically connected another power supply apparatus.

11. The system according to claim 10, wherein if it is determined that M is greater than four, the charging scheduling apparatus is configured to determine remaining M−4 target winding pairs from winding pairs between the two winding pairs distributed on the first end of the magnetic core and the two winding pairs distributed on the second end of the magnetic core.

12. The system according to claim 11, wherein M is an even number, and the remaining M−4 target winding pairs are electrically connected to M/2−2 power supply apparatuses.

13. The system according to claim 11, wherein the M−4 target winding pairs between the two winding pairs distributed at the first end of the magnetic core and the two windings distributed at the second end of the magnetic core are evenly distributed.

* * * * *